United States Patent [19]
Meylan-Rochat

[11] 3,758,178
[45] Sept. 11, 1973

[54] SHOCK ABSORBING BEARING FOR TIMEPIECE AND SMALL APPARATUS

[75] Inventor: Andre Meylan-Rochat, La Brassus, Switzerland

[73] Assignee: Pareohoc S.A., Canton of Vaud, Switzerland

[22] Filed: Feb. 23, 1972

[21] Appl. No.: 228,579

[52] U.S. Cl. .................................................. 308/159
[51] Int. Cl. ............................................ F16c 17/10
[58] Field of Search .................. 58/140 A; 308/158, 308/159, 238, .007

[56] References Cited
UNITED STATES PATENTS

| | | | |
|---|---|---|---|
| 2,956,394 | 10/1960 | Dubois | 58/140 |
| 2,987,638 | 6/1961 | Lux | 308/159 |
| 3,397,531 | 8/1968 | Dubois | 1/238 |
| 3,604,765 | 9/1971 | Babeock | 1/238 |

FOREIGN PATENTS OR APPLICATIONS
235,315  11/1944  Switzerland ..................... 58/140 A Primary Examiner—Charles J. Myhre
Assistant Examiner—Frank Susko
Attorney—I. Irving Silverman et al.

[57] ABSTRACT

A shock absorbing bearing for timepieces and small mechanical apparatus including a plastic bearing body of disc-like configuration having a peripheral thin ring shaped portion secured to a bearing support and a central thickening having a bearing surface. A recess is formed in said thickening opening to the bearing surface for receiving the end of a shaft. The bearing surface has a frusto-conical configuration and the bearing support has a seat of conforming configuration to assure centering. Axial shocks are absorbed by the elastic deformation of the ring shaped portion and lateral shocks are absorbed by elastic deformation of the thickening.

2 Claims, 1 Drawing Figure

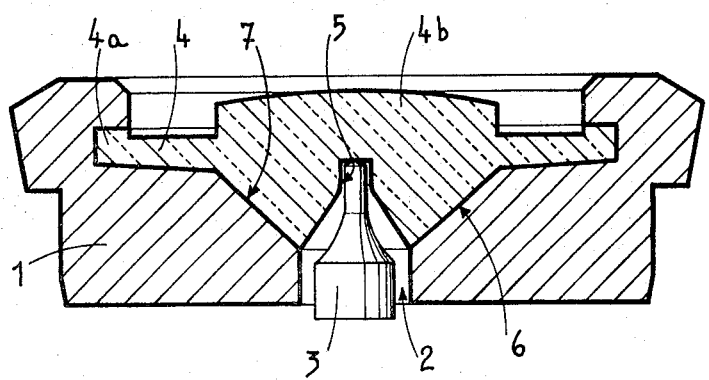

SHOCK ABSORBING BEARING FOR TIMEPIECE AND SMALL APPARATUS

The present invention relates to a shock absorbing bearing for timepiece and small mechanical appartus.

This bearing is characterized by the fact that it includes a bearing body, in plastic material, having the shape of a thin washer, secured at its periphery to a bearing support and showing a central thickening in which is provided a recessed hole intended to receive the end of the shaft, the axial shocks being absorbed by the elastic deformation of the thin ring-shaped part of the bearing body surrounding its central part, while the lateral shocks are absorbed by the elactic deformation of the mass itself of the central thick part of said body.

The drawing shows, by way of example, one embodiment of the object of the invention.

The FIGURE is an axial cut of a bearing for balance-wheel shaft.

The bearing shown comprises a brass support 1, bored with a central hole 2 for the thoroughfare of the shaft designated by 3. The bearing body is constituted by a thin washer 4, in plastic material, secured at its periphery in 4a to the support 1, and which shows a massive central part 4b, in which a recessed hole 5 is provided receiving the end of the shaft 3.

The thick central part 4b of the bearing body is provided with a frusto-conical bearing surface 6 cooperating with a seat of corresponding form 7 of the support 1, in order to ensure the centering of the bearing body with respect to the support.

The bearing body 4 is molded in situ in the support 1.

On axial shocks sustained by shaft 3, the thin ring-shaped part 4a of the bearing body 4 is elastically deformed and its central part 4b separates from the support 1, that absorbs elastically these shocks. As to the lateral shocks sustained by the shaft 3, they are absorbed by the own elasticity of the material of the massive part 4b of the bearing 4.

What I claim is:

1. A shock absorbing bearing for timepieces and small mechanical apparatus which includes a shaft engageable with said bearing; said bearing comprising, a unitary bearing body formed of plastic material and having an axial-shock absorbing thin outer ring and a lateral-shock absorbing thickened central portion, said ring and thickened portion being elastically deformable, a bearing support for receiving said bearing body and means for securing said bearing body to said bearing support at the periphery of said ring, said central thickened portion having an axial recess for receiving the shaft end, the axial thickness of said bearing body at said recess being substantially greater than the ring thickness at its periphery.

2. The bearing as claimed in claim 1 wherein said bearing support has an axial passage and said thickened central portion has a centering cavity having a coaxial frustoconical surface, said bearing support having an axial seat of conforming configuration, said centering cavity opening to said axial passage and said axial recess opening to said central cavity.

* * * * *

UNITED STATES PATENT OFFICE
CERTIFICATE OF CORRECTION

Patent No. 3,758,178      Dated September 11, 1973

Inventor(s) Andre Meylan-Rochat

It is certified that error appears in the above-identified patent and that said Letters Patent are hereby corrected as shown below:

In the itemized introductory data, insert the following:
--[30] Foreign Application Priority Data February 26, 1971 Switzerland 2857/71-- and, in item [75] change "La Brassus" to --Le Brassus-- and, in item [73] change "Pareohoc S.A." to --Parechoc S.A.--

Signed and sealed this 16th day of April 1974.

(SEAL)
Attest:

EDWARD M. FLETCHER, JR.
Attesting Officer

C. MARSHALL DANN
Commissioner of Patents